Patented Feb. 11, 1936

2,030,607

UNITED STATES PATENT OFFICE 2,030,607

METHOD OF PRODUCING NONSHATTERABLE GLASS

Walter Pegler, Parramatta, New South Wales, Australia, assignor to Joseph Leslie Pegler, Beecroft, New South Wales, Australia No Drawing. Application August 28, 1935, Serial No. 38,323. In Australia April 24, 1934

2 Claims. (Cl. 49—81)

The invention relates to the manufacture of what is commonly called "nonshatterable glass" or "safety glass" for the reason that in the event of accident the broken pieces are prevented from scattering, as frequently occurs when ordinary glass is broken, with consequent injury to persons in the vicinity.

The invention is applicable to make a single sheet of nonshatterable glass, but generally will be employed in connection with laminated glass of the kind wherein a film of transparent flexible material is interposed between two sheets of glass and is adherent thereto.

The interposed sheet hitherto employed has consisted of cellulose ester, or celluloid, and in some instances gelatine has been used merely as an adhesive to fix a celluloid sheet to the opposing surfaces of two sheets of glass.

In my invention an interposed film which will prevent glass from scattering when broken is comprised of organic gelatine to which a plasticizer is added to render it flexible, the flexibility being retained for a long period of time.

When it has been shown that a plasticized organic gelatine is capable of successful use for the purpose indicated, it will become apparent to those skilled in the art to which my invention relates, that there are several ways by which it may be carried into practical effect. I, therefore, desire it to be understood that the following examples are merely illustrative and not intended to limit the invention to the particular modes of application herein described.

*Example 1:*—Organic gelatine is soaked in water until it assumes the consistency of stiff jelly, it is then removed from the water and heated to fluidity by placing it in a vessel having a jacket of hot water, or by other usual means a suitable temperature lying between 110 and 180 degrees F. It should be noted that if the gelatine be heated above 180 degrees F. the effect will be to reduce the strength of the ultimate film.

Coloring matter, preferably of transparent character may, if desired, be added at this stage.

A plasticizer which preferably is glycerine in the approximate proportions of a teaspoonful of glycerine to five ounces of the gelatine, before it was soaked in water, is then thoroughly stirred in, the heating continued for a few minutes, and then discontinued and a small quantity of formalin added.

Formalin is employed as and where indicated herein as a preservative, and/or to harden the film and make it unaffected by moisture.

A sheet or plate of glass which has been thoroughly cleansed is placed flat in a pan and the hot gelatine mixture poured over it.

The glass is pressed closely down upon the bottom of the pan to squeeze out air globules which otherwise might be imprisoned between the glass and the pan, and possibly pass between the upper surface of the glass and beneath the gelatinous film upon it. Air bubbles in the gelatine must, as far as possible, be eliminated.

The pan containing the glass, the surface of which is just below the level of the fluid gelatine, is then placed upon a level surface and allowed to stand until the gelatine has gelled which usually will occur in from fifteen to thirty minutes.

The glass with the gelatine film upon it is then lifted from the pan and some of the moisture remaining in the gelatine removed by evaporation which may be hastened by exposing the surface of the film to a current of heated air.

When sufficient moisture has been removed by evaporation, the glass is placed in a bath of formalin (60 per cent water, 40 per cent formaldehyde) and allowed to remain therein for about fifteen minutes.

It is then removed from the formalin and when dry is immersed, with the film side uppermost, in a bath consisting of one part of Canada balsam dissolved in one part of xylol or, in a bath comprised of gelatine dissolved in water charged with about ten per cent of formalin. The sheet of glass thus treated, having been removed from the bath and allowed to become dry, is suitable for many purposes without further treatment. A second sheet of glass will however generally be used as protection for the film and is applicable by means of which the following are examples—

A second sheet of glass preferably of the same size as the first, having been thoroughly cleansed is pressed closely down upon the gelatinous film of the first sheet while still immersed in the solution of Canada balsam, all air bubbles being carefully excluded.

The two sheets of glass are then withdrawn from the bath and placed under pressure of about twenty pounds per square inch for a period of about fifteen minutes which will effect thorough adherence.

When the pressure has been withdrawn and the film has become thoroughly dry, the glass is cleaned, superfluous film removed from its edges, and it is ready for use.

*Example 2:*—The procedure of Example 1 down to the removal of the glass from the bath of formalin having been adopted, the gelatinous film upon the glass is permitted to dry and a thin coat of adhesive in the form of synthetic resin such as:—glycol-phthalic anhydride, phenol-formaldehyde, cresol-formaldehyde, urea, or other condensation product, is applied to it and allowed to become dry.

The sheet so treated with a second similar sheet of glass (which, if considered advisable, may also have a gelatinous film applied to it in the manner above described) are submerged one above the other in a bath of solvent which will affect the coating of synthetic resin. Suitable solvents for the glycol type of synthetic resin are:—xylol, toluol, pyrene, benzol, and solvent naphtha. For the other type of resinous film a mixture of alcohols, or alcohols with amyl-acetate, or acetone, may be used, any of them independently but preferably in a mixture of two or more of them. When the adhesive employed is a glycol resin the proportions of ingredients in the mixture may be twenty parts of the solvent naphtha to four parts each of xylol, toluol, pyrene and benzol.

The solvent is permitted to flow freely between the film upon the first sheet of glass and the surface of the second sheet, or, when both sheets of glass have a film applied to them, then between the two films, for the purpose of eliminating air bubbles and to soften the resinous coating of the film or films.

The film surfaces of the two sheets of glass or the film upon one sheet and the surface of the second sheet are then pressed firmly together by manual means.

The solvent is then drained away and the glass now laminated is placed in a press and subjected to heat.

The temperature and pressure will depend upon the kind of synthetic resin employed as the adhesive. When glycol-phthalic anhydride is used alone the temperature may be 200° F. and the pressure 100 pounds per square inch. When thoroughly united the lamination is withdrawn from the press and cleaned.

To prevent moisture from entering the lamination the surrounding edges are sealed by suitable means. In one method the material between the edges of the sheets of glass is scraped away and substituted by putty or other water resisting material.

Waterproofing may also be effected by trimming away the gelatine film from near the edges of the glass prior to the application to the film of the resinous coating.

When the resin has been softened by the solvent bath a sufficient quantity passes outwardly when the sheets of glass are pressed together to fill the vacancy produced by removal of the gelatine.

The resin will then harden and form a moisture resisting surround to the lamination.

Example 3:—Organic gelatine, as transparent as is obtainable, is soaked in water for about four hours and then washed in running water.

It is then placed in a vessel with cold water sufficient to bring about the proportion of three ounces of gelatine to one pint of water.

The vessel is hot water jacketed and the gelatine being soon dissolved is maintained at a temperature of about 160 degrees F. for about fifteen minutes during which period there is added a plasticizer, preferably diethylene glycol, in proportion equal to six per cent by weight of the solid content of the gelatinous solution, a preservative is also added for instance, solium-ortho-phenyl phenate, in quantity not exceeding one half of one per cent of the solid content of the solution.

The compound thus produced is floated over the surface of a sheet of glass which has been thoroughly cleaned.

It will be found that a quantity of the solution having a solid content of three ounces will effectively cover a square foot of the glass.

The gelatinous layer when sufficiently solidified is thinly coated with glycol-phthalic anhydride which may be poured upon it and distributed by a soft brush.

The glass, with the gelatinous film side uppermost, is then placed in a bath containing a mixture of aromatic hydrocarbons, preferably solvent naphtha and toluol, and a second sheet of glass of size similar to the first is immersed in the bath and pressed closely down upon the film.

The two sheets of glass are then lifted out of the bath and, after draining off, are placed in a heated press wherein they are subjected to a temperature of about 160° F. and a pressure of about fifteen pounds per square inch above the atmosphere for about thirty minutes.

Example 4:—Organic gelatine is soaked in water, as in Example 1, and liquefied by heat, a plasticizer, preferably glycerine in relative proportions of two ounces of glycerine to twelve ounces of the gelatine when dry, is then added with colouring matter if desired.

When the gelatine has become fluid it is poured evenly over a prepared sheet of glass in the manner previously described. Formalin or other agent having a similar effect is not used in this example.

When the gelatinous matter has gelled the glass is lifted with the film upon it and moisture evaporated by exposure to the atmosphere or with the aid of hot air.

The dry gelatinous film now adhering to the glass, not having been rendered insoluble by formalin or the like, is easily and rapidly affected by a natural solvent of gelatine.

Advantage of this fact is taken by rendering the surface of the gelatine "tacky" by a solvent and securing adhesion of the second sheet of glass without the use of other adhesive.

The solvent must not be so violent in action as to disperse the film and I have found that a suitable solvent is comprised of acetic acid and glycerine in equal proportion by volume.

The first sheet of glass is placed in a pan containing the solvent and a second sheet of glass, having been thoroughly cleansed, is pressed firmly upon the gelatinous film, air bubbles being carefully excluded.

The two sheets of glass are then withdrawn from the bath and as acetic acid, in common with other acids, will dissolve gelatine without the aid of heat, the very thin coating of solvent remaining between the gelatine film and the second sheet of glass is sufficient to affect the surface of the gelatine and under pressure of about twenty pounds per square inch for a period of about ten minutes produce perfect adhesion.

The acid may possibly have a slightly detrimental effect upon the quality of the gelatine film and it is possible to substitute it by a bath of glycerine, in which case pressure of about twenty pounds per square inch should be applied to the two sheets of glass while subjected to a temperature from 160 to 200 degrees F.

The uniting of the coating of glycerine with the gelatine film does not however take place so rapidly as when acid is introduced, and therefore when the laminated glass is removed from the hot press it generally will not be ready for use until about twenty-four hours later.

To prevent moisture from affecting the film at the edges of the glass, the lamination is immersed in a bath of undiluted acid (preferably formic). Where the acid contacts with the edges of the film the gelatine will dissolve and pass into the acid bath.

When the gelatine at the edges of the glass has been dissolved out for a space of, say, one sixteenth of an inch in width, the laminated glass is removed from the bath and the surrounding cavity cleaned out and filled with putty or other waterproofing material. The glass is then cleaned and is ready for use.

I claim:

1. A method of producing safety glass consisting in soaking gelatine in water, then heating it until it becomes fluid, mixing formalin and glycerine in approximate proportion of one teaspoonful of glycerine to five ounces of the gelatine with a small amount of formalin, applying the solution thus produced to the surface of a sheet of glass, causing evaporation of moisture, then immersing the glass in a bath of formalin of about 60% of water and 40% of formaldehyde, removing the coated glass therefrom and permitting the film to dry and then placing the glass, film side up, in a bath of resin of Canada balsam in solution, withdrawing the sheet of glass from the resinous bath and drying.

2. A method of producing safety glass consisting in soaking gelatine in water, heating it until it becomes fluid, mixing formalin and glycerine in approximate proportion of one teaspoonful of glycerine to five ounces of gelatine with a small amount of formalin, applying the mixture to the surface of a sheet of glass, then causing evaporation of sufficient moisture from the gelatine, then immersing the coated glass in a bath of formalin consisting of about 60% of water and 40% of formaldehyde, removing the glass from the formalin bath and permitting the film to dry, applying a coating of resin of Canada balsam and drying, immersing the glass with the film uppermost together with another sheet superposed thereon in a solvent adapted to affect the resin of Canada balsam, bringing the sheets of glass together and applying pressure and heat until adhesion has been effected.

WALTER PEGLER.